(12) United States Patent
Galaka et al.

(10) Patent No.: US 10,233,132 B2
(45) Date of Patent: Mar. 19, 2019

(54) ORGANIC OR ORGANO-MINERAL FERTILIZERS, METHOD OF PRODUCING THEREOF AND PRODUCTION UNIT THEREFOR

(71) Applicants: Oleksandr Galaka, Kiev (UA);
Oleksandr Kozlovskyi, Kiev (UA);
Yurii Matvienko, Kiev (UA)

(72) Inventors: Oleksandr Galaka, Kiev (UA);
Oleksandr Kozlovskyi, Kiev (UA);
Yurii Matvienko, Kiev (UA)

( * ) Notice: Subject to any disclaimer, the term of this patent is extended or adjusted under 35 U.S.C. 154(b) by 245 days.

(21) Appl. No.: 15/290,257

(22) Filed: Oct. 11, 2016

(65) Prior Publication Data
US 2017/0107161 A1 Apr. 20, 2017

Related U.S. Application Data

(60) Provisional application No. 62/243,201, filed on Oct. 19, 2015.

(51) Int. Cl.
| C05F 17/00 | (2006.01) |
| C05F 17/02 | (2006.01) |
| C05B 17/00 | (2006.01) |
| B01J 19/00 | (2006.01) |

(52) U.S. Cl.
CPC ......... *C05F 17/0258* (2013.01); *C05B 17/00* (2013.01); *C05F 17/0036* (2013.01); *C05F 17/0217* (2013.01); *B01J 19/008* (2013.01); *C05F 17/02* (2013.01); *Y02P 20/145* (2015.11); *Y02W 30/43* (2015.05)

(58) Field of Classification Search
CPC ................. C05F 17/02; B01J 19/008
See application file for complete search history.

(56) References Cited

U.S. PATENT DOCUMENTS

| 4,686,189 A * | 8/1987 | Redikultsev ............ C05F 17/02 |
| | | 435/286.5 |
| 6,054,319 A * | 4/2000 | Worden ................. C12M 23/06 |
| | | 210/695 |
| 6,065,224 A * | 5/2000 | Eigner ............... C05F 17/0247 |
| | | 34/135 |
| 7,163,629 B2 * | 1/2007 | Abu-Orf ................... C02F 3/28 |
| | | 210/173 |

(Continued)

*Primary Examiner* — Jonathan M Hurst
(74) *Attorney, Agent, or Firm* — Aleksander Smushkovich

(57) ABSTRACT

An apparatus for producing an organic or organo-mineral fertilizer includes —a main tank receiving water, —a reactor providing cavitation and magnetic field for activating water or for treating a biological suspension, —a mixing tank containing a preliminary shredder, —an injector receiving and saturating the suspension with air, —a fermenter receiving the obtained mixture and creating a volumetric liquid-air flow passed therethrough and fermented by biological humus. The suspension is filtered and passed into a clearing tank. At predetermined conditions, the apparatus carries out a method encompassing a preliminary treatment of water in a looped circuit by connecting the main tank with the reactor via a pump. The activated water is supplied to the mixing tank added with preliminary shredded humus. The circuit is reconnected to further treat the suspension, finally shred its particles, supply it to the fermenter, additionally mix it with humus, filter it and thereby obtain the fertilizer.

3 Claims, 1 Drawing Sheet

(56) References Cited

U.S. PATENT DOCUMENTS

| | | | |
|---|---|---|---|
| 8,765,429 B2* | 7/2014 | Holtzapple | F42D 3/00 102/200 |
| 9,347,074 B1* | 5/2016 | Burke | C12P 7/06 |
| 2003/0201225 A1* | 10/2003 | Josse | C02F 1/56 210/605 |
| 2004/0256314 A1* | 12/2004 | Schmid | C02F 1/34 210/603 |
| 2005/0069974 A1* | 3/2005 | Gladkov | C05F 11/02 435/41 |
| 2005/0155930 A1* | 7/2005 | Tunnacliffe | C02F 1/34 210/620 |
| 2008/0281131 A1* | 11/2008 | Kozyuk | B01J 19/008 568/840 |
| 2009/0026133 A1* | 1/2009 | Kelsey | C02F 1/34 210/607 |
| 2011/0070639 A1* | 3/2011 | Pandit | B01F 5/0682 435/306.1 |
| 2012/0021497 A1* | 1/2012 | Larach | C11B 1/06 435/257.1 |
| 2012/0167648 A1* | 7/2012 | Cantizani | C05F 5/006 71/11 |
| 2014/0346108 A1* | 11/2014 | Josse | C02F 1/20 210/605 |
| 2015/0158752 A1* | 6/2015 | Kozyuk | C12P 5/023 435/167 |
| 2015/0336067 A1* | 11/2015 | Ackermann | C10G 32/02 435/167 |
| 2016/0212948 A1* | 7/2016 | McGuire | A01G 9/247 |
| 2016/0340263 A1* | 11/2016 | Lalancette | C05D 1/02 |
| 2017/0145458 A1* | 5/2017 | Gordon | C12P 19/14 |
| 2017/0204349 A1* | 7/2017 | Kozyuk | C11B 3/005 |

* cited by examiner

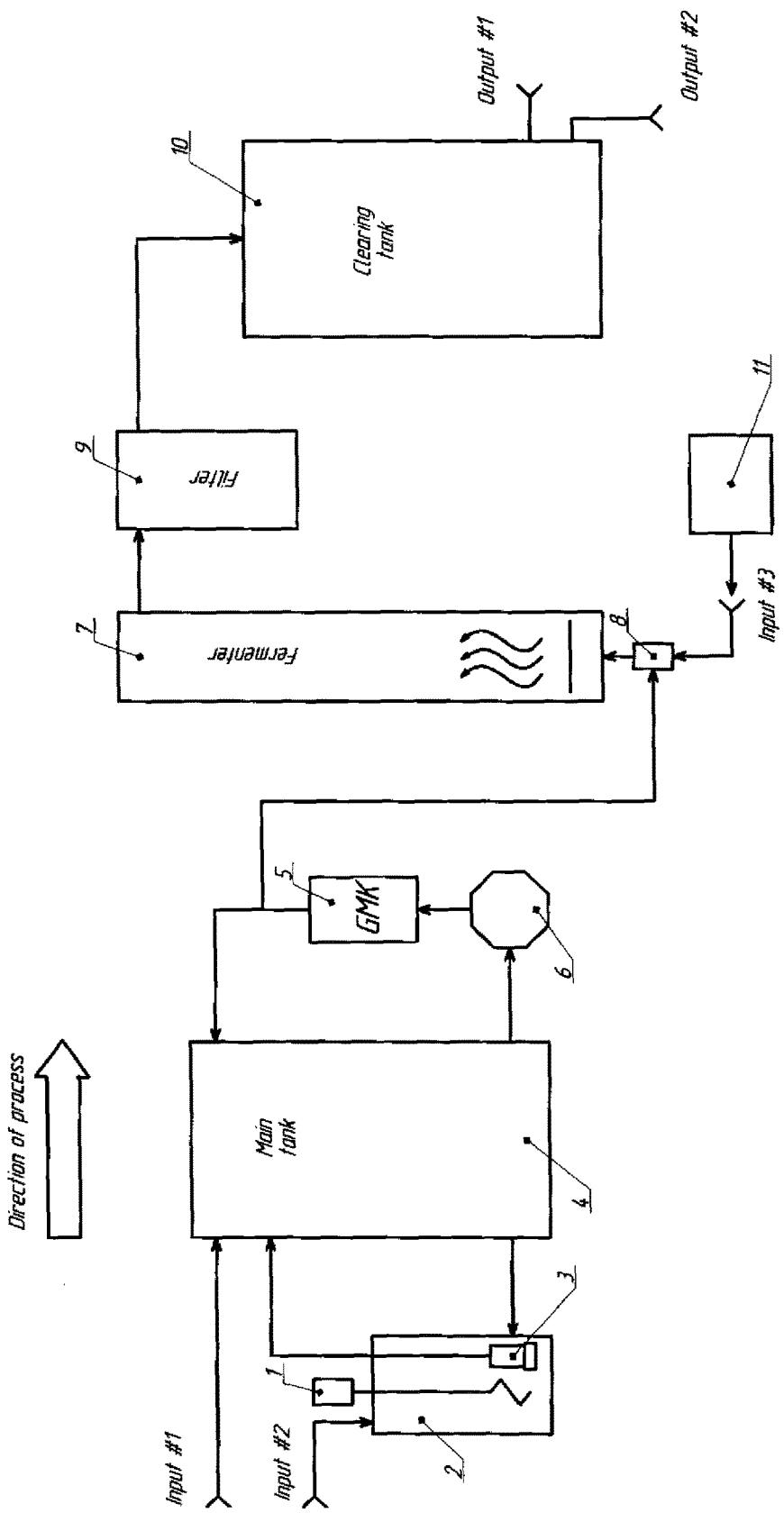

ORGANIC OR ORGANO-MINERAL FERTILIZERS, METHOD OF PRODUCING THEREOF AND PRODUCTION UNIT THEREFOR

CROSS-REFERENCES TO RELATED APPLICATIONS

The present patent application claims the benefit of a U.S. provisional patent application Ser. No. 62/243,201 filed on Oct. 19, 2015, the disclosure of which is incorporated herein in its entirety by reference.

FIELD OF INVENTION

The invention primarily relates to agriculture and is intended to produce liquid and environmentally clean organic and organo-mineral fertilizers based on processing biological humus by hydrodynamic cavitation with the use of a vortex type hydrodynamic reactor. The invention may also be applied in pharmacology, cosmetology and chemical industry for shredding and mixing various components.

BACKGROUND OF THE INVENTION

There are known various methods and equipment for production of organic and inorganic fertilizers, for example produced by Wirlston Machinery or Feeco International. Such companies manufacture and sell a variety of machines, e.g. rotary granulators, pipe reactors, rotary dryers, rotary coolers, pug mills, hummer mills, pin mixers, disc pelletizers, roll compactors, etc. However, the instant authors have found that it's much more convenient and effective to have one apparatus that combines therein all major steps for producing fertilizers. Such apparatus allows for expediting the process and obtaining a higher quality product. The core of such apparatus is a multifunctional hydrodynamic reactor capable of providing several operations in combination with other pieces of equipment, which allows developing an innovative technology for production of environmentally clean organic and organo-mineral fertilizers.

OBJECT AND BRIEF SUMMARY OF THE INVENTION

Therefore, the primary purpose of the invention is to develop a multifunctional hydrodynamic reactor of vortex type (herein called "GMK reactor") and method of producing liquid organic and organo-mineral fertilizers by employing the GMK reactor in dynamic combinations with other components of inventive equipment.

Application of the GMK reactor enables to combine, in a single device, processes of water activation and shredding biological humus to the size of 100 to 700 nanometers, so that a nature of physical and chemical processes is changed in a sole cycle of fertilizer production.

Moreover, the inventive method thus proposed enables to have a wide range of organo-mineral fertilizers by imparting in their composition any element/substance by its shredding and mixing in the GMK reactor. Since the GMK reactor has a general application, it may particularly be used to uniform, simplify and, therefore, to cheapen, as much as possible, the production of organic fertilizers.

The manner to produce the inventive liquid organic fertilizer follows:

There are two components only serving as initial raw materials. These are water and biological humus.

The water component used is of potable quality with a minimal quantity of chemical impurities. The best-suited water component has the following recommended features: temperature—from 15 to 20° C.; general mineralization—from 10 to 40 ppm, oxidation and restoration potential—from +200 to +300 mV, and PH level—from 7 to 8.5 points. If necessary, water is preliminary treated to have the recommended parameters. The water temperature does not exceed 50 Celsius degree upon preparing the fertilizer.

The second component of the inventive organic fertilizer is biological humus. The initial biological humus is a product of processing of organic wastes of various origins, preferably by industrial population of Californian worms. Such wastes may be of animal, crop, domestic, food and other origins. Biological humus is an organic compound of high molecular weight that has a cyclic structure and acyclic chains, preferably generated through Californian worms processing organic substances. Such biological humus contains abundant humic substances, major and minor elements, aminoacids, enzyme, plant hormone, natural antibiotics and living and agronomically useful biological flora.

Chemical additives are not used to produce the organic fertilizer. Additional components may be imparted into the composition of organo-mineral fertilizer during its production, depending on agricultural applications of such fertilizer.

The process of production of the inventive fertilizer comprises four phases:

1st phase. Preliminary Activation of Water.

The preliminary activation means changing physical and chemical properties of water under the influence of hydrodynamic cavitation and magnetic field. These factors initiate chemical reactions in water and change its structure and properties as related to solving organic compounds and solid bodies in water. The treatment takes from 20 to 25 minutes.

2nd phase. Preliminary Preparation of Biological Suspension from Initial Humus.

A biological suspension is made by mechanical mixing of biological humus in the pre-activated water. The biological humus is preliminary shredded approximately to the size of 0.5 mm and impurities are separated from it in the process of preparing the biological suspension. Such operation can be provided by known high shear dispersers, for instance, produced by Mixer Direct, Inc. Therefore, 2nd phase results in obtaining the biological suspension.

3rd phase. Production of Liquid Organic Fertilizer.

At this phase, the shredding of the biological suspension is finalized to the size of 100 to 700 nanometers in active water. The so obtained fertilizer is saturated with necessary major and minor elements by their extraction from biological humus during its shredding and activating chemical reactions in the water component together with its structuring at the same time.

The total quantity of dissolved minor elements and organic substances ranges from 1200 to 1400 ppm. The PH indicator increased by 2 to 2.5 units, so that the suspense has an alkaline nature and its value as a fertilizer is increased. The treatment takes from 30 to 45 minutes. A temperature of the so prepared suspension does not exceed 50° C. The so produced suspension is now ready for direct application as organic fertilizer.

4th phase. Microbiological Fermentation of Agronomically Useful Biological Flora in Initial Biological Humus.

Since the entire biological flora is destroyed upon producing the liquid organo-mineral fertilizer during the 3rd phase, due to cavitation processes in the GMK reactor, at the 4th phase, the fertilizer is enriched with living and agronomically useful biological flora that increases its consumer properties.

Thus, the biological suspension is fed into a fermenter where, by passing through initial biological humus; the biological suspension is actively filled and saturated with useful biological flora from the initial biological humus in the fermenter.

Fermentation occurs at a temperature from 30 to 40° C. This temperature, coupled with a continuous airing, creates the most favorable conditions for germination of bacteria, which is crucial for aggregate efficiency of the fermentation. Moreover, as solid particles in the suspension reduces, an aggregate usable area that may be occupied by biological flora increases so that the so obtained products become more efficient due to the augmentation of a number of useful bacteria contained therein. The fermentation takes from 30 to 45 minutes.

At the same time, as the 1st and the 2nd phases of the production cycle occur, the inventive apparatus (described below) treats water and the fertilizer with a constant magnetic field with magnetic induction B=150-200 mT. The magnetic treatment of the suspension additionally facilitates the changing of its spatial structure, so that water may be actively hydrated with ions of minor elements comprising the biological humus.

In addition, the magnetic treatment of water reduces its surface tension so that minor and major elements from the biological humus may better penetrate together with water through intercellular membranes of plants and have a favorable effect on photosynthesis processes in the plants.

After the magnetic treatment, the water component has increased antifungal (decontaminating) properties, and plants are exposed to a lesser degree to various diseases and have more robust and sound growth. This reduces the need to apply various chemicals to fight plant diseases.

This way of production enables to produce organic fertilizer containing the following elements (% of the mass):

| Nitrogen | 0.005-3.0 |
|---|---|
| Phosphorus | 0.005-3.0 |
| Potassium | 0.03-3.0 |
| Calcium | 0.005-1.0 |
| Magnesium | 0.004-0.5 |
| Iron | 0.0003-0.05 |
| Manganese | 0.00001-0.001 |
| Copper | 0.00005-0.005 |
| Water-soluble humates | 0.0001-0.6 |
| Others | other major elements comprising biological humus and dissolved in insignificant quantities |

The useful biological flora of organic fertilizer may contain from $1 \times 10^6$ to $1 \times 10^{12}$ bacterial clumps in one ml.

The so produced fertilizer contains abundant humic substances, major and minor elements, aminoacids, enzyme, plant hormone, natural antibiotics and living and agronomically useful biological flora. It is more accessible for plants, activates biochemical process in plants, stimulate the increase in their immunity, significantly increases the efficiency of root and foliar nutrition of plants. All of this leads to the higher yield of agricultural crops and increasing quality of products and vegetation of ornamental plants.

Since the fertilizer has no odor, it is suitable for indoor use as supplementary feeding for ornamental plants.

Since the fertilizer contains a significant amount of potassium humates, the soil forms into water-resistant fine structure that facilitates the preservation of soil water in a root zone. High contents of useful biological flora in humus that generates biologically active substances make plants more resistant to diseases and pests, as well as more resistant to adverse weather conditions.

The fertilizer has a significant effect on soil acidity and features of changing its structure towards optimizing the humus contents in the soil and thus facilitating the restoration of soils.

A liquid form of the so produced organic fertilizer may be treated as a disperse system with a liquid dispersing medium and a solid dispersing phase (suspension). Such suspension is highly stable since biological humus is shredded to the size of 100 to 700 nanometers and is as liquid as water is. The fertilizer practically has no sediments and its guarantee period of storage is up to one year. This indicator, in particular, causes high consumer features of the liquid fertilizer and is largely determinant for both the efficient treatment and reliable operation of the equipment used to treat (sprinkle) plants. Since plants are best treated by sprinkling, which is one of the most efficient and inexpensive ways, the suspension must be stable for successful agricultural operations.

It would have the widest application to treat seeds, foliar dressing of plants, soaking tree young plants and root application in soil by sprinkling.

Therefore, the inventive apparatus for producing an organic or organo-mineral fertilizer comprises: - a main tank capable of receiving at least a water component supplied thereinto; —a hydrodynamic reactor capable of producing hydrodynamic cavitation and magnetic field therein, provided, at a predetermined pressure, for activating the water component supplied thereinto, or for treating of a biological suspension supplied thereinto from said main tank, wherein said treating of the biological suspension results in a fine shredding of particles of the biological suspension and in obtaining a treated biological suspension; —a mixing tank at least capable of receiving and mixing biological humus supplied thereinto; —a preliminary shredder mounted in said mixing tank; said preliminary shredder is capable at least of preliminary shredding the biological humus contained in the tank, thereby obtaining said biological suspension further pumped out from the mixing tank to the main tank; —an injector receiving said treated biological suspension, saturating said treated biological suspension with air, thereby obtaining a liquid mixture of air and the treated biological suspension; —a fermenter containing a pulverizer; said fermenter receives said liquid mixture from the injector, creates, by means of the pulverizer, a volumetric flow of air and liquid with bubbles that is passed through the fermenter, and being fermented by biological humus supplied thereinto, thereby obtaining a fermented suspension; and —a filter trapping dispersed large particles of biological humus from said fermented suspension, and passing through a so obtained filtered suspension into a clearing tank connected to the filter, wherein a heavy fraction of the filtered suspension sinks onto a bottom of the clearing tank, and the remaining filtered suspension exits the clearing tank as the fertilizer.

Accordingly, the inventive method for producing an organic or organo-mineral fertilizer employs said apparatus, wherein said apparatus further comprises: a main pump capable of pumping contents of the main tank from said main tank to the hydrodynamic reactor; a drainage pump mounted in the mixing tank and capable of outputting contents thereof; said method comprising the steps of: —supplying the water component to the main tank; —creating a looped recirculation circuit by connecting the main tank with the main pump, subsequently with the hydrodynamic reactor, and subsequently with the main tank; —preliminary activating the water component in the hydrodynamic reactor by means of hydrodynamic cavitation and magnetic field during a predetermined activation time (ranging 20 to 25 minutes) and at the predetermined pressure that doesn't exceed 0.5 atm, thereby obtaining an activated water component; —supplying the activated water component from the hydrodynamic reactor via the looped recirculation circuit to the main tank; —disconnecting the looped recirculation circuit; —supplying the activated water component from the main tank to the mixing tank; —adding a predetermined quantity of biological humus into the mixing tank; —activating the preliminary shredder and preliminary shredding particles of the biological humus in the mixing tank thereby obtaining a biological suspension; —separating impurities from the biological suspension in the mixing tank; —suppling the biological suspension from the mixing tank to the main tank through the drainage pump; —reconnecting the looped recirculation circuit; —treating the biological suspension by cavitation and magnetic field in the hydrodynamic reactor in the looped recirculation circuit at a predetermined temperature (preferably 50° C.); —finally shredding the biological suspension to a predetermined final size (ranging from 100 to 700 nanometers) in the hydrodynamic reactor; —supplying the biological suspension from the hydrodynamic reactor to the injector; —supplying pressurized air to the injector; —creating by the pulverizer a volumetric air and liquid flow with bubbles (having a diameter ranging from 1.5 to 3 mm); —supplying said volumetric air and liquid flow from the injector to the fermenter; —supplying said biological humus into the fermenter, wherein said biological humus contains biological flora; —saturating said volumetric air and liquid flow by the biological flora in the fermenter, at a predetermined fermentation temperature (ranging from 25° to 30° C.) thereby obtaining a fermented product; —filtering the fermented product by the filter thereby obtaining the filtered suspension; —supplying the filtered suspension from the filter to the clearing tank; and —clearing said fermented suspension from remaining particles of biological humus in the clearing tank during a predetermined clearing time (ranging from 4 to 8 hours), thereby obtaining said fertilizer.

DRAWING OF THE PRESENT INVENTION

The attached FIGURE depicts a block-diagram representing major units of the inventive apparatus for implementation of aforesaid technology for producing organic (organo-mineral) fertilizers.

DESCRIPTION OF PREFERRED EMBODIMENTS OF THE PRESENT INVENTION

While the invention may be susceptible to embodiment in different forms, there is shown in the drawing, and will be described in detail herein, a specific exemplary embodiment of the present invention, with the understanding that the present disclosure is to be considered an exemplification of the principles of the invention, and is not intended to limit the invention to that as illustrated and described herein.

The inventive apparatus comprises the following components/units shown in the attached FIGURE:

1—a preliminary shredder (for which known high shear dispersers can be employed, see 2nd phase above) of biological humus that shreds and mixes biological humus (see 2nd phase above) in the tank 2 (see below);

2—a tank for mixing and preliminary treatment by the preliminary shredder 1 of the biological humus received from the main tank 4 (see below); the preliminary shredder 1 is mounted in the tank 2;

3—a drainage pump for pumping the biological suspension out from the tank 2;

4—a main tank receiving the biological suspension from the tank 2 via the drainage pump 3, receiving a preliminary treated water component from the GMK reactor (see below), mixing the biological suspension with the treated water component, thereby obtaining a mixture;

5—a hydrodynamic reactor of vortex type GMK (herein also called a GMK reactor) combining processes of activation (by cavitation and magnetic field, see 1st phase above) of water supplied thereto and fine shredding of biological humus (see 3rd phase above); the reactor 5 receives a mixture of the activated water and biological humus (i.e. a biological suspension) from the main tank 4 via the main pump 6 (see below); the GMK reactor 5 first activates the water component (see 1st phase above) with a constant magnetic field with a magnetic induction B=150-200 mT, and then (see 3rd phase above) the GMK reactor 5 treats the biological suspension with a constant magnetic field with a magnetic induction B=150-200 mT; the reactor 5 outputs the activated water component after 1st phase to the main tank 4, and outputs the treated biological suspension after 3rd phase to the injector 8 (see below);

6—a main pump pumping the mixture from the main tank 4 into the GMK reactor 5;

7—a fermenter containing a pulverizer (i.e. a sprinkler-dispenser);

8—an injector;

9—a filter;

10—a clearing tank for products; and

11—a compressor.

Inputs and outputs:

Input No. 1 is an input for supply of working water;

Input No. 2 is an input for supply of biological humus; and

Input No. 3 is an input for supply of air to create a predetermined density of air and liquid flow in the fermenter 7.

Output No. 1 is an output of finished products after clearing; and

Output No. 2 is an output of a heavy fraction generated in the process of clearing.

Operation of the Inventive Apparatus.

After starting the inventive apparatus, water with the above-mentioned standardized parameters is supplied through input No. 1 to fill up the main tank 4. Thereafter, a looped (enclosed) recirculation circuit is created by connecting respective taps of the following components: main tank 4—main pump 6—GMK reactor 5—main tank 4. This circuit creates and always maintains a manometer pressure up to 0.5 atm. After the circuit is connected and the manometer pressure is reached, the main pump 6 is on and the GMK reactor 5 activates water (by cavitation and magnetic field, see 1st phase above) in this circuit within 20 to 25 minutes, and then the looped circuit is disconnected.

After the activation process, the activated water component is supplied from the tank 4 to the mixing tank 2. Thereafter, a predetermined quantity of biological humus is added to the tank 2 through input No. 2. After the tank 2 is filled up, the preliminary shredder 1 is switched on (2nd phase) to preliminary shred particles of the biological humus approximately to the size of 0.5 mm, to mix the contents of the tank 2, and to separate foreign objects, thereby completing 2nd phase. The so prepared biological suspension is supplied to the main tank 4 through outputting by the drainage pump 3.

After the main tank 4 is filled up, the looped circuit is reconnected (3rd phase): main tank 4—main pump 6—GMK reactor 5—main tank 4. The looped circuit creates again the manometer pressure up to 0.5 atm., which is maintained during the processing of the biological suspension. The biological suspension is treated by cavitation and magnetic field in the reactor 5 in the looped circuit at a temperature of 50° C., while the shredding of the biological suspension is finalized to the size of 100 to 700 nanometers in active water. After the 3rd phase is completed, the so treated biological suspension is supplied to the fermenter 7, containing a pulverizer mounted therein, through the injector 8.

The fermenter 7 is preliminary filled with the treated biological suspension based on activated water at a temperature ranging from 25° to 30° C. After filling up the fermenter 7, the treated biological suspension is actively mixed with the air flows supplied from an external source (e.g. a compressor 11) to create a uniform substance throughout the entire volume of the fermenter 7 (4th phase).

While passing through the injector 8, the treated biological suspension is saturated with air supplied from a compressor 11. A flow of air and liquid so generated enters the fermenter 7 wherein the pulverizer creates a volumetric air and liquid flow with bubbles ranging from 1.5 to 3 mm. The so obtained volumetric flow is fermented by biological flora during 30 to 35 minutes while the volumetric air and liquid flow passes though the biological suspension in the fermenter.

After passing through the fermenter 7, the so obtained product passes through the filter 9. The filter 9 deters dispersed large particles of biological humus that may get into the finished product during the process of fermentation.

After passing through the filter 9, the finished product is passed to the clearing tank 10 of finished products. The products stay in the tank 10 during 4 to 8 hours to clear from potentially remaining dispersed large particles of biological humus and acquires required final properties due to physical and chemical processes caused by changed physical and chemical properties of the suspension. Thereafter, the finished product is ready for use.

The proposed method and apparatus enable in a simple way to produce high-quality and all-purpose liquid organic (organo-mineral) fertilizer based on biological humus with improved parameters as compared with existing types of fertilizers.

What is claimed is:

1. An apparatus for producing an organic or organo-mineral fertilizer comprising:

a main tank (4) capable of receiving at least a water component supplied thereinto;

a hydrodynamic reactor (5) capable of producing hydrodynamic cavitation and magnetic field therein, provided, at a predetermined pressure, for activating the water component supplied thereinto, or for treating of a biological suspension supplied thereinto from said main tank (4), wherein said treating of the biological suspension results in a fine shredding of particles of the biological suspension and in obtaining a treated biological suspension;

a mixing tank (2) at least capable of receiving and mixing biological humus supplied thereinto;

a preliminary shredder (1) mounted in said mixing tank (2); said preliminary shredder (1) is capable at least of preliminary shredding the biological humus contained in the mixing tank (2), thereby obtaining said biological suspension further pumped out from the mixing tank (2) to the main tank (4);

an injector (8) receiving said treated biological suspension, saturating said treated biological suspension with air, thereby obtaining a liquid mixture of air and the treated biological suspension;

a fermenter (7) containing a pulverizer; said fermenter (7) receives said liquid mixture from the injector (8), creates, by means of the pulverizer, a volumetric flow of air and liquid with bubbles that is passed through the fermenter (7) being fermented by biological humus supplied thereinto, thereby obtaining a fermented suspension; and a filter (9) trapping dispersed large particles of biological humus from said fermented suspension, and passing through a so obtained filtered suspension into a clearing tank (10) connected to the filter (9), wherein a heavy fraction of the filtered suspension sinks onto a bottom of the clearing tank (10), and a remaining filtered suspension exits the clearing tank (10) as the fertilizer.

2. The apparatus according to claim 1, wherein: said magnetic field is characterized with a magnetic induction being from 150 to 200 mT; said predetermined pressure is constant and doesn't exceed 0.5 atm; the water component is activated by the hydrodynamic reactor (5) within a time interval from 20 to 25 minutes; upon being activated, the water component has the following characteristics: a temperature is from 15 to 20° C.; a general mineralization is from 10 to 40 ppm, an oxidation and restoration potential is from +200to +300 mV, and a PH level is from 7 to 8.5 points;

said preliminary shredding of the biological humus results in obtaining particles of the biological humus having a size essentially of 5 mm; and particles of said biological suspension are characterized with a size from 100 to 700 nanometers.

3. The apparatus according to claim 1, wherein:

a process of fermentation in the fermenter (7) occurs at a temperature from 30 to 40 ° C. and lasts from 30 to 45 minutes.

* * * * *